United States Patent
Gratton et al.

(10) Patent No.: US 11,307,094 B2
(45) Date of Patent: Apr. 19, 2022

(54) SYSTEM AND METHOD FOR HYPERSPECTRAL IMAGING IN HIGHLY SCATTERING MEDIA BY THE SPECTRAL PHASOR APPROACH USING TWO FILTERS

(71) Applicant: THE REGENTS OF THE UNIVERSITY OF CALIFORNIA, Oakland, CA (US)

(72) Inventors: Enrico Gratton, San Clemente, CA (US); Alexander Dvornikov, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 16 days.

(21) Appl. No.: 16/886,092

(22) Filed: May 28, 2020

(65) Prior Publication Data
US 2020/0378830 A1    Dec. 3, 2020

Related U.S. Application Data

(60) Provisional application No. 62/853,237, filed on May 28, 2019.

(51) Int. Cl.
| | |
|---|---|
| *G01J 3/28* | (2006.01) |
| *G01N 21/64* | (2006.01) |
| *G01J 3/44* | (2006.01) |
| *H04N 9/04* | (2006.01) |
| *H04N 5/235* | (2006.01) |

(52) U.S. Cl.
CPC ......... *G01J 3/2823* (2013.01); *G01J 3/2803* (2013.01); *G01J 3/4406* (2013.01); *G01N 21/64* (2013.01); *H04N 5/2352* (2013.01); *H04N 9/04551* (2018.08); *G01J 2003/2826* (2013.01)

(58) Field of Classification Search
None
See application file for complete search history.

(56) References Cited

U.S. PATENT DOCUMENTS 3,901,600 A * 8/1975 Johnson, Jr .......... G01N 21/272
356/319
6,142,652 A * 11/2000 Richardson ............. F21V 13/14
362/280

(Continued)

OTHER PUBLICATIONS

Dvornikov A, Gratton E. Hyperspectral imaging in highly scattering media by the spectral phasor approach using two filters. Biomedical optics express. Aug. 1, 2018;9(8):3503-11. (Year: 2018).*

(Continued)

*Primary Examiner* — Clifford Hilaire
(74) *Attorney, Agent, or Firm* — Riverside Law LLP

(57) ABSTRACT

An imaging system comprises an excitation light source, a directing element positioned to direct light from the excitation light source toward a sample, a detector configured to measure incoming light from the sample, a filter cavity positioned between the sample and the detector, a first filter configured to be inserted into the filter cavity, a sine filter configured to be inserted into the filter cavity, and a processing unit communicatively connected to the detector, configured to receive image data from the detector to form an image. Methods of constructing a hyperspectral image of a sample are also described.

19 Claims, 10 Drawing Sheets

(56) References Cited

U.S. PATENT DOCUMENTS

| | | | | |
|---|---|---|---|---|
| 2007/0229946 | A1* | 10/2007 | Okada | G01N 21/6458 359/385 |
| 2014/0293279 | A1* | 10/2014 | Kwok | G01N 21/65 356/301 |
| 2014/0363840 | A1* | 12/2014 | Mycek | G01N 33/6887 435/29 |
| 2015/0323462 | A1* | 11/2015 | Ghosh | G01N 35/00029 435/29 |
| 2017/0102329 | A1* | 4/2017 | Corbett | G01N 21/64 |
| 2019/0056581 | A1* | 2/2019 | Tomer | G02B 21/0048 |
| 2019/0222813 | A1* | 7/2019 | Kane | H04N 9/646 |
| 2019/0287222 | A1* | 9/2019 | Cutrale | G01J 3/2823 |

OTHER PUBLICATIONS

Cutrale F, Trivedi V, Trinh LA, Chiu CL, Choi JM, Artiga MS, Fraser SE. Hyperspectral phasor analysis enables multiplexed 5D in vivo imaging. Nature methods. Feb. 2017;14(2):149-52. (Year: 2017).*

Malacrida L, Gratton E, Jameson DM. Model-free methods to study membrane environmental probes: a comparison of the spectral phasor and generalized polarization approaches. Methods and applications in fluorescence. Nov. 12, 2015;3(4):047001. (Year: 2015).*

Malacrida, L., et al., Spectral phasor analysis of LAURDAN fluorescence in live A549 lung cells to study the hydration and time evolution of intracellular lamellar body-like structures. Biochim Biophys Acta, 2016. 1858(11): p. 2625-2635.

Andrews, L.M., et al., Detecting Pyronin Y labeled RNA transcripts in live cell microenvironments by phasor-FLIM analysis. Methods Appl Fluoresc, 2013. 1(1): p. 015001.

Malacrida, L., D.M. Jameson, and E. Gratton, A multidimensional phasor approach reveals LAURDAN photophysics in NIH-3T3 cell membranes. Sci Rep, 2017. 7(1): p. 9215.

Ranjit, S., et al., Characterizing fibrosis in UUO mice model using multiparametric analysis of phasor distribution from FLIM images. Biomed Opt Express, 2016. 7(9): p. 3519-3530.

Fereidouni, F., et al., Phasor analysis of multiphoton spectral images distinguishes autofluorescence components of in vivo human skin. J Biophotonics, 2014. 7(8): p. 589-96.

Fereidouni, F., A.N. Bader, and H.C. Gerritsen, Spectral phasor analysis allows rapid and reliable unmixing of fluorescence microscopy spectral images. Opt Express, 2012. 20(12): p. 12729-41.

Wang, P., et al., Fiber pattern removal and image reconstruction method for snapshot mosaic hyperspectral endoscopic images. Biomed Opt Express, 2018. 9(2): p. 780-790.

Cutrale, F., et al., Hyperspectral phasor analysis enables multiplexed 5D in vivo imaging. Nat Methods, 2017. 14(2): p. 149-152.

Lavagnino, Z., et al., Snapshot Hyperspectral Light-Sheet Imaging of Signal Transduction in Live Pancreatic Islets. Biophys J, 2016. 111(2): p. 409-417.

Elliott, A.D., et al., Real-time hyperspectral fluorescence imaging of pancreatic beta-cell dynamics with the image mapping spectrometer. J Cell Sci, 2012. 125(Pt 20): p. 4833-40.

Crosignani, V., A.S. Dvornikov, and E. Gratton, Enhancement of imaging depth in turbid media using a wide area detector. J Biophotonics, 2011. 4(9): p. 592-9.

Malacrida, L., E. Gratton, and D.M. Jameson, Model-free methods to study membrane environmental probes: a comparison of the spectral phasor and generalized polarization approaches. Methods Appl Fluoresc, 2015. 3(4): p. 047001.

* cited by examiner

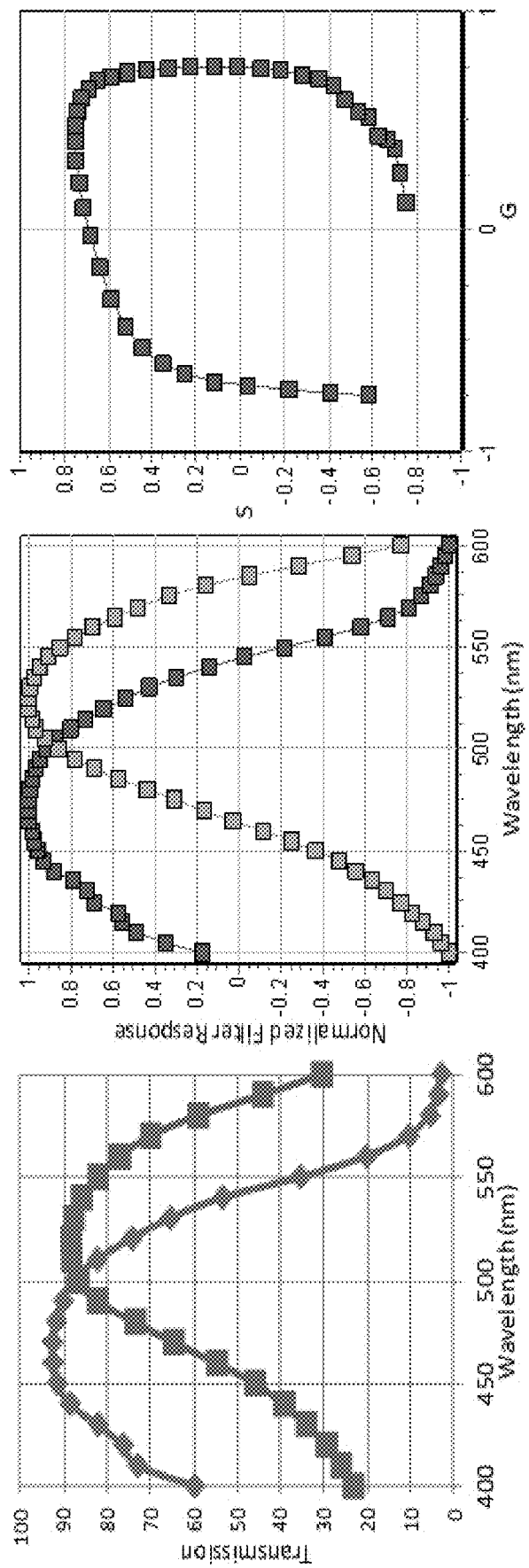

SYSTEM AND METHOD FOR HYPERSPECTRAL IMAGING IN HIGHLY SCATTERING MEDIA BY THE SPECTRAL PHASOR APPROACH USING TWO FILTERS

CROSS-REFERENCE TO RELATED APPLICATIONS

This application claims priority to U.S. Provisional Patent Application No. 62/853,237, filed on May 28, 2019, incorporated herein by reference in its entirety.

STATEMENT REGARDING FEDERALLY SPONSORED RESEARCH OR DEVELOPMENT

This invention was made with government support under Grant No. P41-GM103540 awarded by the National Institutes of Health. The government has certain rights in the invention.

BACKGROUND OF THE INVENTION

Hyperspectral imaging is a common technique in fluorescence microscopy to obtain the emission spectrum at each pixel of an image. However, methods to obtain spectral resolution based on diffraction gratings or integrated prisms work poorly when the sample is strongly scattering.

Fluorescence microscopy and spectroscopy are commonly used to study (co)localization of multiple components in biological specimens. These components can be distinguished by their spectroscopic properties, and simultaneously imaged by, for instance, hyperspectral imaging (HSI), fluorescence lifetime imaging (FLIM), Second-Harmonic Imaging Microscopy (SHIM), or combinations of these techniques.

HSI generates a map of a region of interest based on local chemical composition. HSI has been used in non-medical applications including satellite investigation to indicate areas of chemical weapons production and to assess the condition of agricultural fields and has recently been applied to the investigation of physiologic and pathologic changes in living tissue in animal and human studies to provide information as to the health or disease of tissue that is otherwise unavailable. HSI has been shown to accurately predict viability and survival of tissue deprived of adequate perfusion, and to differentiate diseased tissue (e.g. tumor) and growth due to cancerous angiogenesis in a rat model system of breast cancer.

HSI is a remote sensing technology in which a 2-dimensional image is created having spectral data inherent in each pixel. It is possible to correlate the spectrum of each pixel with the presence and concentration of various chemical species. This data can then be interpreted as a "gradient map" of these species in a surface. In essence, HSI is a method of "imaging spectroscopy" combining the chemical specificity of spectroscopy with the spatial resolution of imaging. Light is separated into hundreds of wavelengths using a spectral separator and collected on a charge-coupled device (CCD) or a complementary metal oxide semiconductor (CMOS) sensor in much the same way that a picture is taken by an ordinary camera.

FLIM is typically employed to image molecular interactions on a nanometer scale by means of monitoring fluorescence resonance energy transfer (FRET), spectral imaging is the preferred way to study colocalization of multiple fluorophores on a pixel scale. Moreover, identification of endogenous fluorophores in complex biological samples can be performed by spectral imaging and spectral imaging of environment sensitive probes can be used to probe e.g. polarity, pH and calcium concentration at a subcellular level. The major disadvantage of spectral imaging is that it requires complex analysis algorithms. Emission spectra are often broad and extend into multiple spectral channels. For spectral demixing, the individual contributions of the fluorescent components to the total signal must be extracted from the data. Linear unmixing can be employed where the recorded spectra are mathematically unmixed using a number of fixed reference spectra of pure components. The reference spectra are usually based on literature data or obtained in separate reference measurements. The use of such reference spectra can easily introduce artifacts because of changes in the spectra caused by solvatochromic shifts or other environmental effects. To correct for these effects, extensive calibration is required. In some situations, principle component analysis can be employed as an alternative method of spectral demixing, but principle component analysis cannot be applied in the presence of solvatochromic time dependent shifts.

SHIM is typically employed in imaging cell and tissue structure and function. SHIM constructs an image from variations in a specimen's ability to generate second-harmonic light from an incident light source. This contrasts with conventional microscopy which detects variations in optical density, path length, or refractive index of a specimen.

Spectral phasors were recently introduced as an alternative to spectral demixing, for the determination of FRET and for the measurement of dipolar relaxation of probes in membranes (Andrews L M et al., Methods Appl Fluoresc, 2013, 1(1):015001; Cutrale F et al., Methods Appl Fluoresc, 2013, 1(3):035001; Malacrida L et al., Biochim Biophys Acta, 2016, 1858(11):2625-2635; Malacrida L et al., Methods Appl Fluoresc, 2015, 3(4):047001; Malacrida L et al., Sci Rep, 2017, 7(1):9215; Ranjit S et al., Biomed Opt Express, 2016, 7(9):3519-3530; Fereidouni F et al., J Biophotonics, 2014, 7(8):589-96; Fereidouni F et al., Opt Express, 2012, 20(12):12729-41). The basic concept in the spectral phasor approach is that the entire spectrum is not needed for some of the classical spectral analysis techniques such as demixing—only a few parameters of the spectral distribution are sufficient for these calculations. In the original papers in this area, the focus was on using the zero and first component of the spectral Fourier transform as a proxy for the entire spectrum (Andrews L M et al., Methods Appl Fluoresc, 2013, 1(1):015001; Cutrale F et al., Methods Appl Fluoresc, 2013, 1(3):035001). In the case in which the spectrum is dominated by few spectral bands, this approach is very efficient and provides fast and valid alternatives to the analysis of the full spectrum. This is particularly convenient in cases like spectral analysis during surgery, in live animals studies and in all those cases in which full hyperspectral imaging is not feasible or is inconvenient (Wang P et al., Biomed Opt Express, 2018, 9(2):780-790; Cutrale F et al., Nat Methods, 2017, 14(2):149-152).

One example of a system that could greatly benefit from the phasor analysis approach in tissue spectroscopy (absorption and fluorescence) is the case in which the light to be collected has undergone multiple scattering. The multiple-scattered light travels in all directions so that it cannot be easily focused on the entrance slit of a dispersive element or transformed into a parallel beam for use with hyperspectral cameras. In thick-tissue spectroscopy, the light, after being transmitted through the tissue, is emitted over a very large cone angle. The various schemes available to capture this transmitted (or fluorescence) light only use a relatively narrow angle of the emitted light with severe reduction of the signal (Lavagnino Z et al., Biophys J, 2016, 111(2):409-417; Elliott A D et al., J Cell Sci, 2012, 125(Pt 20):4833-40).

Thus, there is a need in the art for an improved fluorescence microscope and processing method for hyperspectral imaging to enhance spectral resolution in strongly scattering samples. The present invention satisfies that need.

SUMMARY OF THE INVENTION

In one aspect, an imaging system comprises an excitation light source, a directing element positioned to direct light from the excitation light source toward a sample, a detector configured to measure incoming light from the sample, a filter cavity positioned between the sample and the detector, a first filter configured to be inserted into the filter cavity, a sine filter configured to be inserted into the filter cavity, and a processing unit communicatively connected to the detector, configured to receive image data from the detector to form an image.

In one embodiment, the excitation light source is selected from the group consisting of: a Ti:Sa laser, a white laser, a widely tunable laser, a fiber laser, a tungsten lamp, and a white LED. In one embodiment, the system further comprises a light permeable media positioned between the sample and the filter cavity. In one embodiment, the first filter is a plastic cyan transmission filter. In one embodiment, the second filter is a plastic green transmission filter. In one embodiment, the first filter and the second filter are provided on a rotating filter wheel having a filter space that is empty or has a transparent filter. In one embodiment, the first filter and the second filter are provided on a filter slide having a filter space that is empty or has a transparent filter. In one embodiment, the system further comprises three detectors, wherein a first detector is coupled to the first filter, a second detector is coupled to the second filter, and a third detector is coupled to a transparent filter or to no filter.

In one embodiment, the detector has three detecting regions, a first region coupled to the first filter, a second region coupled to the second filter, and a third region coupled to a transparent filter or to no filter. In one embodiment, the imaging system is incorporated into a camera having the first filter, the second filter, and a transparent filter applied to separate regions of the detector. In one embodiment, the system further comprises a group velocity dispersion (GVD) compensator. In one embodiment, the system further comprises an acoustic-optic modulator. In one embodiment, the system further comprises an x-y galvanometric scanner. In one embodiment, the system further comprises a non-transitory computer-readable memory with instructions stored thereon, which when executed by the processing unit, construct a hyperspectral image of a sample, the instructions comprising the steps of recording a light intensity as $F_1(\lambda)$ over a wavelength range while the first filter is positioned between the sample and the detector, recording a light intensity as $F_2(\lambda)$ over the wavelength range while the second filter is positioned between the sample and the detector, recording a total intensity as $I(\lambda)$ over the wavelength range with no filter or a transparent filter positioned between the sample and the detector, calculating a normalized transmission of the first filter, calculating a normalized total intensity of transmission through the first filter, calculating a spectral phasor coordinate of the normalized total intensity through the first filter, calculating the normalized transmission of the second filter, calculating the normalized total intensity of transmission through the second filter, calculating the spectral phasor coordinate of the normalized total intensity through the second filter, and generating a hyperspectral image of the sample based on the calculated spectral phasor coordinates.

In one embodiment, the first filter is a cosine filter and the second filter is a sine filter. In one embodiment, the first filter is a linearly increasing transmission filter and the second filter is a linearly decreasing transmission filter.

In another aspect, a method of constructing a hyperspectral image of a sample comprises the steps of passing an excitation light source through a sample and through a first filter and recording, with a detector, a light intensity as $F_1(\lambda)$ over a wavelength range, passing the excitation light source through the sample and through a second filter and recording, with the detector, a light intensity as $F_2(\lambda)$ over the wavelength range, passing the excitation light source through the sample unfiltered and recording, with the detector, a total intensity as $I(\lambda)$ over the wavelength range, calculating a normalized transmission of the first filter, calculating a normalized total intensity of transmission through the first filter, calculating a spectral phasor coordinate of the normalized total intensity through the first filter, calculating the normalized transmission of the sine filter, calculating the normalized total intensity of transmission through the second filter, calculating the spectral phasor coordinate of the normalized total intensity through the second filter, and generating a hyperspectral image of the sample based on the calculated spectral phasor coordinates.

In one embodiment, the wavelength range is between 400 nm and 1000 nm. In one embodiment, the method further comprising the steps of applying a first correction factor to the phase and amplitude of the normalized total intensity of transmission through the first filter, and applying a second correction factor to the phase and amplitude of the normalized total intensity of transmission through the second filter.

In another aspect, a method of constructing a hyperspectral image of a sample comprises the steps of passing an excitation light source through a sample and through a filter with linearly increasing transmission and recording, with a detector, a light intensity as $F_{increase}(\lambda)$ over a wavelength range, passing the excitation light source through the sample and through a filter with linearly decreasing transmission and recording, with the detector, a light intensity as $F_{decrease}(\lambda)$ over the wavelength range, calculating the channel ratio using the general polarization formula, and generating a hyperspectral image of the sample based on the calculated general polarization.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 4A through FIG. 4C depict the results of experiments demonstrating cos-sin filter transmission. FIG. 4A shows the filter transmission. Outside the region between about 400 nm and 600 nm, the transmission is zero with the addition of bandpass filters. FIG. 4B shows the output of the filters normalized and shifted to give the range of the cosine and sine functions. FIG. 4C shows the phasor representation of the G and S function obtained with the filters. Note that the polar phasor plot of the filters deviates from the perfect cosine and sine functions (should be a circle).

FIG. 5A shows the correction factors for the phase and amplitude of the filter obtained by comparing the measured response with the ideal response of the cos-sin functions. The phase measured at a given wavelength is compared with the theoretical value (horizontal arrow). For the theoretical value of the phase, the correction factor of the modulation is read from the graph. FIG. 5B shows that after the correction is applied, the filters have the ideal response. FIG. 5C shows the phasor representation of the filter after correction is now a circle, as it should be for a perfect (cos-sin) filter combination.

FIG. 9A shows the linear combination of phasor positions obtained using the cos-sin filters. FIG. 9B shows the linear combination using the lifetime phasor approach.

FIG. 10A shows a hyperspectral image obtained with the cos-sin filter in a DIVER microscope. FIG. 10B shows a hyperspectral image of the same sample obtained with the wavelength detector of the Zeiss 710 confocal microscope. The samples were excited at 740 nm using two photon excitation in both cases.

DETAILED DESCRIPTION

Figure 1:
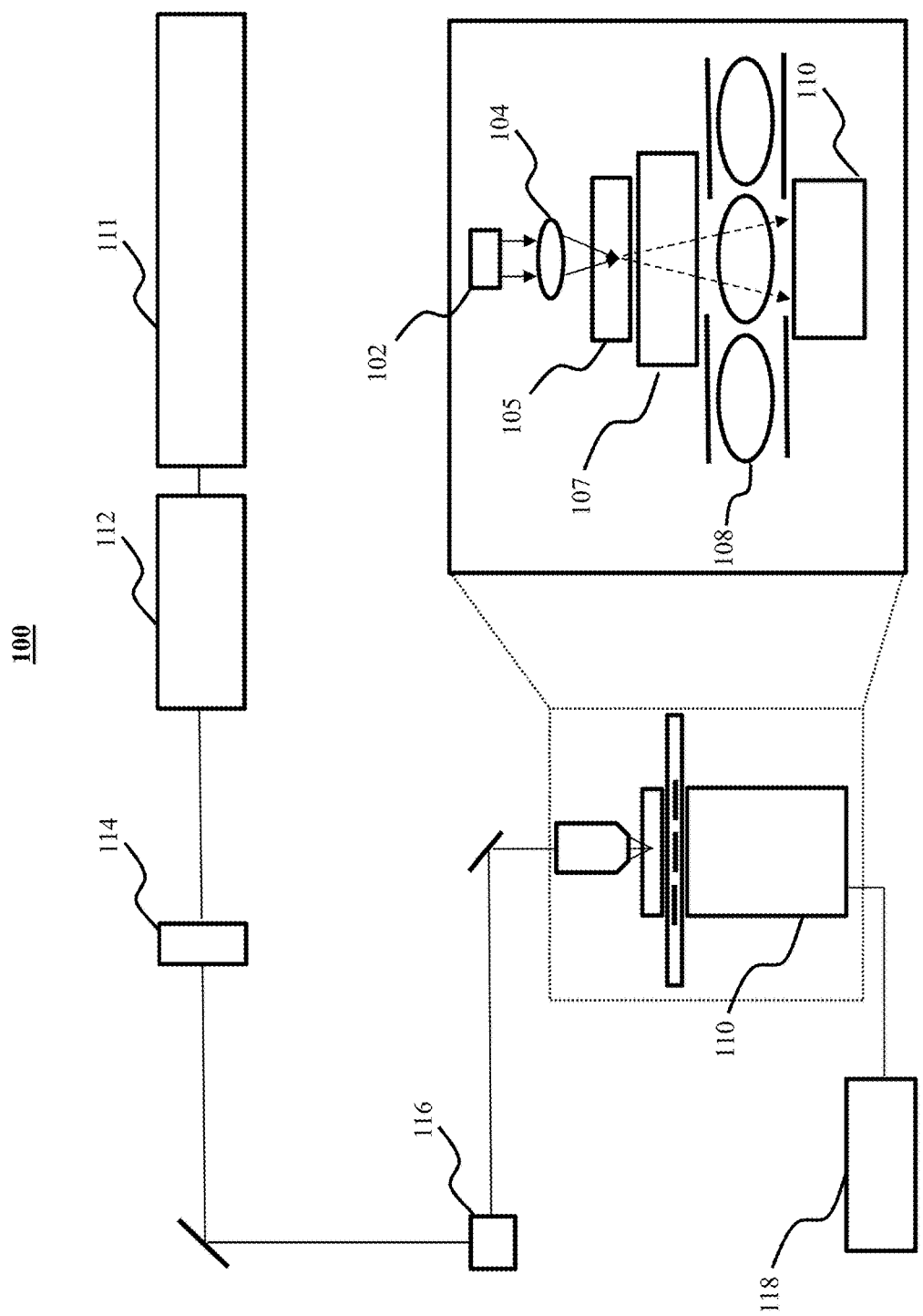
FIG. 1 is a schematic of the components of an exemplary microscope system.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Although aspects of the present invention may refer to exemplary embodiments of an imaging system, for example as a microscope, a DIVER microscope, or the like, it is understood that as used herein, the term "imaging system" may refer to any imaging or spectroscopy system, including but not limited to any system capable of microscopy (spatial resolution 1 nm-10 µm) as typically used for sub-cellular and cellular imaging, mesoscopic imaging (spatial resolution 1 µm-1 mm) as typically used for sub-cellular and cellular and tissue imaging including tissue biopsies, macro-imaging (spatial resolution 100 µm-10 mm) as typically used for tissue and large tissue imaging such as the skin, breast, the head and limbs or fat, for example, to separate healthy from tumor or diseased tissue. In other embodiments, an imaging system may include or further comprise a fluorescence or phosphorescence lifetime detection system, for example including a photomultipliers, photodiodes, avalanche photodiodes, CCD cameras with an image intensifier that can be modulated, CMOS cameras with two or more storage wells for photoelectrons per pixel that can be modulated.

Imaging System

One aspect of the present disclosure is related to deep imaging via an enhanced-photon recovery (DIVER) microscope design that can capture a very large solid angle of the emitted light (close to 2π sr). In some embodiments, the microscope is configured to capture light in a solid angle of at least π/2 sr, at least π sr, or at least 2π sr. The DIVER microscope, depending on the tissue thickness, can capture several orders of magnitude more light than conventional microscopes (Crosignani V et al., J Biophotonics, 2011, 4(9):592-9). An advantage (and limitation) of the DIVER design is that the transmitted fluorescence is not collimated. Therefore, in the transmitted path of the DIVER microscope, glass filters are employed since these filters are largely insensitive to the incident angle, which could be very large. Some embodiments of the present invention provide an imaging system that modifies the DIVER design with other filtering materials, for example plastic filters. In one embodiment, the filters are Cyan and Green filters from Neewer 18×20 cm Transparent Color Correction Lighting Gel Filter Set, available on Amazon cat #B016Q0BA6A. The modified DIVER microscope is therefore capable of obtaining hyperspectral information using the spectral phasor approach. In one embodiment, the cyan filter has a transmission response that is similar to a cosine response over the measured spectral region, for example a spectral region between 400-600 nm. In one embodiment, the green filter has a transmission response that is similar to a sine response over the measured spectral region, for example a spectral region between 400-600 nm. Although green and cyan filters are presented in this example, and a 400-600 nm spectral region is used, it is understood that systems and methods of the present invention may be used in alternative spectral ranges, and therefore that different colored filters may be necessary to approximate the sin-cos filters needed. For example, in a lower spectral range, the sin filter may be a blue filter and the cos filter may be a cyan filter. In a higher spectral range, the sin filter may be a green filter and the cos filter may be a yellow filter. In various embodiments, systems of the present invention may be used with any pair of filters with a substantially paired sine/cosine response. Other examples include commercial Kodak filters (e.g., Kodak 81EF & 80A) or Lee filters (LEE Filters Worldwide). Systems and methods of the present invention may be configured for use with spectral ranges in various parts of the visible, near-infrared, far-infrared, and/or ultraviolet spectra of light.

The exemplary DIVER microscope was developed for imaging turbid samples to depths of 5 mm or more. The samples can be for example transparent, translucent, or highly scattering, such as from oxyhemoglobin, deoxyhemoglobin, fat, and water. The large imaging depth is achieved with an innovative photon recovery system which allows for the collection of emitted photons from a wide area of a sample, while conventional detection schemes collect photons only from a relatively small area, thereby losing most fluorescence photons. The DIVER microscope reduces light loss by matching the refractive index throughout the optical path between a sample and the detector. The DIVER microscope is based on two-photon fluorescence excitation provided by a tunable femtosecond Ti:Sa laser supplied with a group velocity dispersion (GVD) compensation attachment to maximize fluorescence excitation efficiency at a sample. Although the microscope used in this exemplary embodiment of the invention uses a Ti:Sa laser, it is understood that other lasers or illumination sources may be used, for example a tungsten lamp, a white LED, or white supercontinuum lasers. The power level of the excitation beam can be adjusted by a regulator, such as an acousto-optic modulator (AOM), or by inserting neutral density filters in the exciton path.

Referring now to FIG. 1, an exemplary imaging system 100 of the present invention is depicted. The system comprises an excitation light source 102, a directing element 104 configured to direct the light from excitation source 102 toward sample 105, at least two filters 108, and a detector 110. Light source 102 can be any suitable light source, including but not limited to a Ti:Sa laser, a tungsten lamp, a white LED, and the like. The at least two filters 108 can include a cosine filter (such as a plastic cyan filter) and a sine filter (such as a plastic green filter), a linearly increasing spectral filter, a linearly decreasing spectral filter, or any other suitable filter. The at least two filters 108 can be provided in any suitable filter switching apparatus, such as a rotating filter wheel or a filter slider with an empty filter slot or a transparent filter. Transparent filters of the present invention may be made with substantially the same material as the dyed filters, or may alternatively be made from a different material. The filter switching apparatus can be operated in a variety of ways, including manually operated, mechanically controlled, or switched in an automated manner using an electromechanical actuator. In various embodiments, the system 100 can further include an excitation energy source 111, for example a laser, which in one embodiment is a MaiTai Ti:As Laser. In the depicted embodiment, the system 100 includes a GVD compensator 112, a regulator 114 (such as an AOM), an xy galvanometric scanner 116, a FLIM unit, and a central processing unit (CPU) 118. In certain embodiments, system 100 can further include or be electronically connected to a monitor for real-time display of the spectral phasor and spectral decomposition in sample components. In some embodiments, the monitor may comprise a projector, a head-mounted display, a smart phone, a visual aid, or any other suitable display device.

In one embodiment shown in FIG. 1, the directing element is a lens, for example an objective lens. However, it is understood that in one embodiment the directing element could be a fiber optic element, or any other optical or physical element configured to direct a quantity of electromagnetic energy. The exemplary embodiment further includes a scattering or clear media 107 positioned between the sample 105 and the at least two filters 108.

In the exemplary embodiment, the detector 110 comprises a head-on photomultiplier tube (PMT) with a photocathode that operates in photon-counting mode. Two-photon induced fluorescence photons are multiply-scattered inside a turbid sample and are collected by detector 110 from a wide surface area. Because of multiple scattering, photons originally directed out of detector 110 have a probability to be redirected and enter detector 110. For the same reason, in the multiple scattering media where photons continuously change direction, light losses due to total internal reflection at the sample/detector boundary are reduced and fluorescence photons that reach it can be picked up by detector 110 from any incident angle.

In one embodiment, the detector is configured to detect electromagnetic radiation within a certain wavelength range, for example between 300 nm and 2 µm, or between 400 nm and 1 µm, or between 400 nm and 600 nm, or between 600 nm and 1 µm, or any other suitable wavelength range.

In various embodiments, the components of imaging system 100 can be rearranged to improve its functionality and portability. For example, in some embodiments the components of imaging system 100 can have three separate detectors 110, one detector 110 coupled to a cosine filter, one detector 110 coupled to a sine filter, and one detector 110 coupled to a transparent filter or without a filter. This may be accomplished for example by splitting the light after it passes through the sample with one or more beam splitters, directing the split light into the individual detectors. In some embodiments, the components of imaging system 100 can have a detector 110 with three detecting regions, a first region coupled to a cosine filter, a second region coupled to a sine filter, and a third region coupled to a transparent filter or without a filter. In various embodiments, imaging system 100 can be integrated into a handheld form factor. In some embodiments, imaging system 100 can be integrated into a wearable form factor.

In some embodiments, a spectroscopy system may comprise one or multiple excitation light source(s), lenses of fiber optics to guide the light from the excitation light source(s) on or into a sample, one or multiple detector(s) configured to measure incoming light from the sample, or a filter cavity positioned between the sample and the detector(s). In one embodiment, two or more filters with specific, known transmission spectra are configured to be inserted into the filter cavity. Exemplary transmission filter spectra include, but are not limited to, a sine and cosine filter configured to be inserted into the filter cavity. In some embodiments, a spectroscopy system comprises a processing unit communicatively connected to the detector, configured to receive data from the detector to form an image. In one embodiment, the excitation light source is selected from the group consisting of: a Ti:Sa laser, a tungsten lamp, and a white LED. In one embodiment, the system further comprises a light permeable media positioned between the sample and the filter cavity. In one embodiment, the cosine filter is a plastic cyan transmission filter. In one embodiment, the sine filter is a plastic green transmission filter. In one embodiment, the filter transmission spectrum is linearly increasing. In one embodiment, the filter transmission spectrum is linearly decreasing.

In one embodiment, an imaging or spectroscopy system with one or multiple detectors may be configured to measure incoming light from a sample generated by bioluminescence or chemiluminescence. In one embodiment, an imaging device may comprise a filter cavity positioned between the sample and the one or more detectors. In one embodiment, two or more filters with specific, known transmission spectra may be inserted into the filter cavity. Suitable transmission filter spectra include, but are not limited to, a sine and cosine filter configured to be inserted into the filter cavity. In one embodiment, a processing unit is communicatively connected to the detector, configured to receive data from the detector to form an image. In one embodiment, the cosine filter is a plastic cyan transmission filter. In one embodiment, the sine filter is a plastic green transmission filter. In one embodiment, the filter transmission spectrum is linearly increasing. In one embodiment, the filter transmission spectrum is linearly decreasing.

In some embodiments, filters may be used that have a different spectral response as a function of wavelength. Examples include sine and cosine transmission filters and filters with linearly increasing and decreasing transmission, but other filter transmission profiles can be used as well. In some embodiments, parameters of the filter spectral profile of one or more of the filters is used to calculate the spectral profile of the detected light.

In one embodiment, a system comprises two filters, wherein a first filter increases transmission linearly within the detection spectral range, and wherein a second filter decreases transmission linearly within the detection spectral range. The spectral position of the detected light may in some embodiments be calculated by phasor analysis or by calculating the ratio of the two detection channels, for example, with the general polarization formula.

In one embodiment, a system comprises the aforementioned spectral detection combined with fluorescence or phosphorescence lifetime detection. In some embodiments, a system may comprise one or more detectors having suitable temporal resolution, including, but not limited to, photomultipliers, photodiodes, avalanche photodiodes, CCD cameras with an image intensifier that can be modulated, or CMOS cameras with two or more storage wells for photoelectrons per pixel that can be modulated.

In another aspect, the two-filter approach described herein can be used for fluorescence lifetime phasor analysis or combined spectral and lifetime phasors.

Method of Hyperspectral Imaging

As described elsewhere herein, the present invention relates to imaging systems that are configured to collect fluorescence emission over a very large collection angle. The imaging system uses a cosine filter and a sine filter that accept uncollimated light over a large aperture to calculate the spectral phasor and resolve spectral components for hyperspectral imaging.

Figure 2:
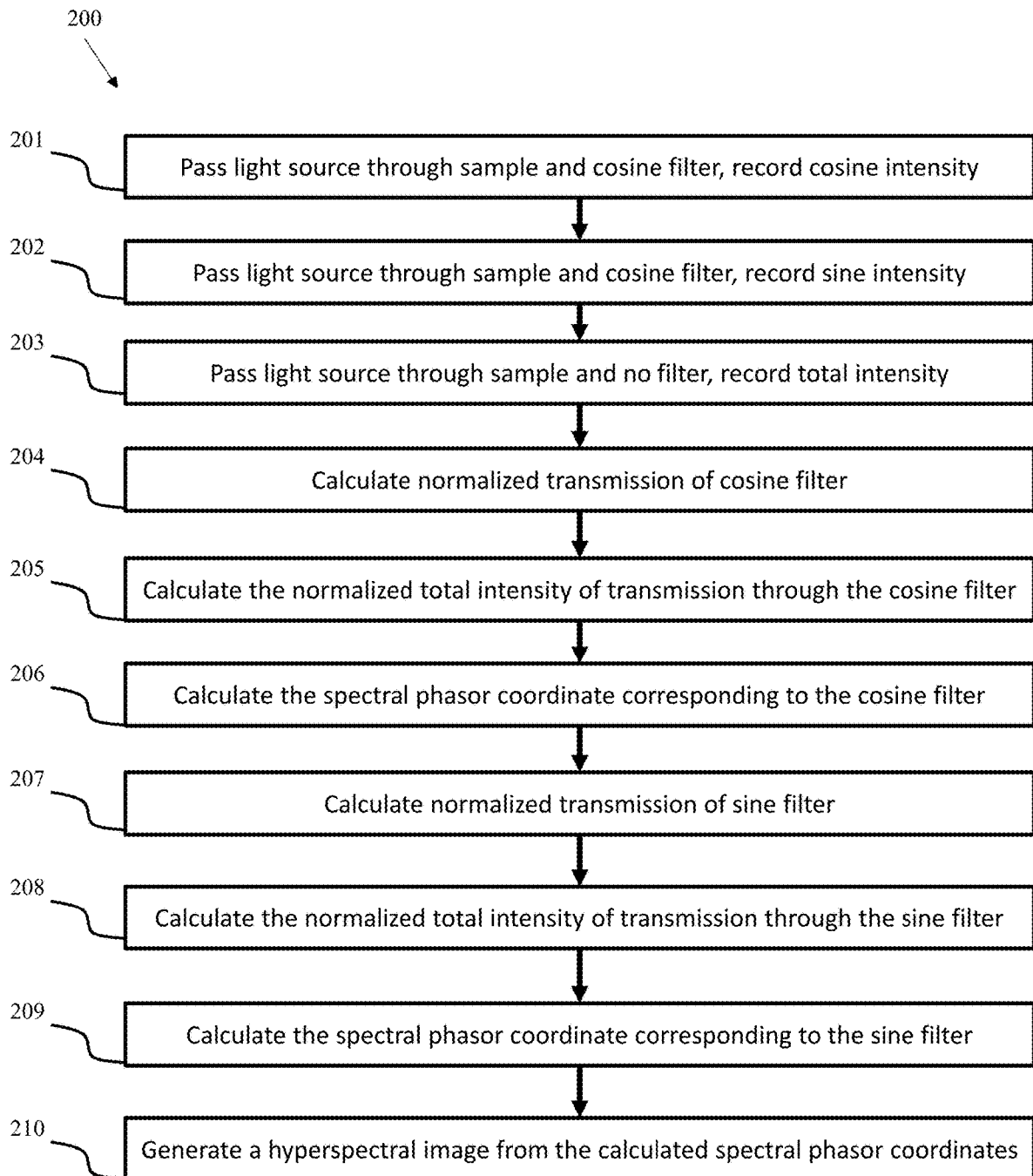
FIG. 2 is a flowchart for an exemplary method of hyperspectral imaging.

Referring now to FIG. 2, an exemplary method 200 of constructing a hyperspectral image is depicted. Method 200 beings with step 201, an excitation light source is passed through a sample and through a first filter and a detector records a light intensity as $F_1(\lambda)$ over a wavelength range. In step 202, the excitation light source is passed through the sample and through a second filter and the detector records a light intensity as $F_2(\lambda)$ over the wavelength range. In step 203, the excitation light source is passed through the sample without a filter and the detector records a light intensity as $I(\lambda)$ over the wavelength range. In step 204, the normalized first transmission is calculated. In step 205, the normalized total intensity of transmission through the first filter is calculated. In step 206, the spectral phasor coordinate of the normalized total intensity through the first filter is calculated. In step 207, the normalized transmission of the second filter is calculated. In step 208, the normalized total intensity of transmission through the second filter is calculated. In step 209, the spectral phasor coordinate of the normalized total intensity through the second filter is calculated. In step 210, a hyperspectral image of the sample is generated based on the calculated spectral phasor coordinates. The theory behind the calculations is provided as follows.

Classical Calculation of the Spectral Phasor Components

In the common application of the spectral phasor method (Malacrida L et al., Methods Appl Fluoresc, 2015, 3(4): 047001; Crosignani V et al., J Biophotonics, 2011, 4(9): 592-9), the transmitted or fluorescence emission is collected with a spectrograph to provide the spectrum that is indicated by $I(\lambda)$ over a spectral band $\Delta\lambda$. The emission spectrum of a sample, recorded on the DIVER microscope, is used to calculate the real and imaginary components (the amplitude and phase, respectively) for the first harmonic Fourier transformed spectrum (X and Y, called G and S, respectively).

The G and S components of the spectral phasor are defined to be:

$$G = \frac{\sum_\lambda \left[I(\lambda)\cos\left(2\pi n\left(\frac{\lambda}{\Delta\lambda}\right)\right)\right]}{\sum_\lambda I(\lambda)} \quad \text{Equation 1}$$

$$S = \frac{\sum_\lambda \left[I(\lambda)\sin\left(2\pi n\left(\frac{\lambda}{\Delta\lambda}\right)\right)\right]}{\sum_\lambda I(\lambda)} \quad \text{Equation 2}$$

where the sum is calculated in the bandwidth $\Delta\lambda$ and n is an index to characterize the harmonics in the Fourier coefficients given by the G and S expressions. The G and S components obtained using this calculation are plotted in a polar plot called the spectral phasor plot for every pixel of an image or for different locations in a tissue sample (Malacrida L et al., Methods Appl Fluoresc, 2015, 3(4): 047001).

For multiple scattering samples, the collection of $I(\lambda)$ can be problematic. Consider first the case of collection of the fluorescence from a scattering sample. The direct excitation light is assumed to be filtered out. Here it is shown that to obtain the data necessary for the calculation of the phasor spectral components, the emission side of the microscope can use a filter that transmits the light in a "cosine and sine" profile over a bandwidth $\Delta\lambda$. The image obtained when these filters are inserted in the collection path will directly provide the numerator of the expressions for G and S in Eq. (1) and Eq. (2) after some manipulation as explained below. The denominator could be obtained by removing the filters since the numerator is the total intensity. Using this approach 3 images need to be collected: with the cos filter, with the sin filter, and without the filters or with a transparent filter. The G and S coordinates of the spectral phasor are then calculated at each point of the image using Eq. (1) and Eq. (2).

Calculation of the First and Second Response of Transmission Filters

In one example, the first and second filters are cosine and sine filters, respectively, and $F_{cos}(\lambda)$ and $F_{sin}(\lambda)$ indicate the transmission of the first and second filters. More generally, including where other filters are used, the transmission of the first and second filters may be denoted as $F_1(\lambda)$ and $F_2(\lambda)$. The G and S coordinates of the spectral phasor can be rewritten in terms of the transmission of the filters. $I(\lambda)$ indicates the total intensity measured in the absence of the filters.

The G and S coordinates obtained from the transmission through the filters are not equal to the mathematical expression of Fourier spectral components given in Eq. (1) and Eq. (2), unless the filters have a perfect cos and sin transmission and they span from −1 to +1, which cannot be obtained with transmission filters. Therefore, the response of each filter must be shifted and normalized to give the G and S components. Using a spectrophotometer, the transmission of each filter can be obtained in a given bandwidth $\Delta\lambda$ and in the range between 0 and 1. Indicating with $F_{cosMAX}$ and $F_{cosMIN}$ the maximum and minimum transmission for the cos filter (and similarly for the sin filter) as determined by the transmission spectrum, Eq. (1) and Eq. (2) can be modified to the following form (only the G component is shown here since the expression for the S component is similar after exchanging the cos with sin). The filter transmission is normalized using the following expression, where $F_{cos}(\lambda)$ is the transmission spectrum of the cos filter at each wavelength (the transmission is multiplied by 2 and subtracted by 1):

$$F(\lambda)_{norm} = \frac{2(F_{cos}(\lambda) - F_{cosMIN})}{F_{cosMAX} - F_{cosMIN}} - 1 \qquad \text{Equation 3}$$

Now $F(\lambda)_{norm}$ is in the range between +1 and −1, as it should be for a cosine filter.

The measured normalized total light ($I_{cos}$) of an unknown spectrum $S(\lambda)$ after passing through the cos filter is given by:

$$I_{cos} = \frac{\sum_\lambda [F_{cos}(\lambda) I(\lambda)]}{\sum_\lambda I(\lambda)} \qquad \text{Equation 4}$$

This total intensity must be normalized using Eq. (3) to give the spectral phasor coordinate G (and similarly for the component S):

$$G = \frac{2(I_{cos} - F_{cosMIN})}{F_{cosMAX} - F_{cosMIN}} - 1 \qquad \text{Equation 5}$$

The normalization procedure only uses the transmission spectrum as obtained with the spectrophotometer of the cosine and sine filters from which the maximum and minimum transmission of the filters is obtained in a given bandwidth $\Delta\lambda$. The normalization factor is measured only once for each filter.

Linear Combination of the Spectral Phasor Components

The G and S components measured using Eq. (5) have the same properties of the G and S Fourier components in Eq. (1) and Eq. (2). For example, they obey the law of linear combination of components addition as shown below. If $I_1$ and $I_2$ represent 2 different spectra and they are mixed in a fractional contribution to the total intensity as $f_1$ and $f_2 = 1 - f_1$ then each individual spectral component is as follows:

$$G_1 = \frac{\sum_\lambda [I_1(\lambda) I_{1cos}(\lambda)]}{\sum_\lambda I(\lambda)} \qquad \text{Equation 6}$$

$$G_2 = \frac{\sum_\lambda [I_2(\lambda) I_{1cos}(\lambda)]}{\sum_\lambda I(\lambda)} \qquad \text{Equation 7}$$

and for the combination of the two components:

$$G = \frac{\sum_\lambda [I(\lambda) I_{cos}(\lambda)]}{\sum_\lambda I(\lambda)} = \qquad \text{Equation 8}$$

$$\frac{\sum_\lambda [f_1 I_{1cos}(\lambda)]}{\sum_\lambda I(\lambda)} + \frac{\sum_\lambda [f_2 I_{2cos}(\lambda)]}{\sum_\lambda I(\lambda)} = f_1 G_1 + (1 - f_1) G_2$$

There is an analogous expression for the S component. The law of linear combination remains valid provided that $\Sigma_\lambda I(\lambda)$ is the total intensity measured over the entire bandwidth. The same reasoning applies to an arbitrary number of components.

The aforementioned features enable this technology to be highly suitable for multiplexed detection of labeled or unlabeled biomarkers or biosensors in all types of strongly scattering samples or tissues. The embodiments disclosed herein are particularly effective in distinguishing 1) more than three dyes with only three channels/detectors, 2) two or more dyes that have a very similar emission spectrum, and/or 3) for photochromic probes that gradually change their emission spectrum depending on their environment. In one embodiment, a sample comprises a thin or thick highly scattering tissue (e.g. skin, brain, tumor, etc.) with autofluorescent moieties or unlabeled biomarkers of interest, with spectral characteristics which can be better detected and resolved with this tool. In another embodiment, a sample comprises a thin or thick strongly scattering sample with biomarkers that have been labeled with fluorescent reporter molecules or biosensors to elicit a particular spectral or lifetime signature.

In other embodiments, the disclosed systems and methods can be used for diagnostic purposes, for example imaging tissues including skin, breast, the head and limbs or fat. In one embodiment, the systems and methods are used to distinguish healthy tissues from cancer or diseased tissues.

In some aspects of the present invention, software is provided to execute the operations relating to the equations and calculations provided herein. The software executing the instructions provided herein may be stored on a non-transitory computer-readable medium, wherein the software performs some or all of the steps of the present invention when executed on a processor or a controller.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the exemplary embodiments of the present invention, and are not to be construed as limiting in any way the remainder of the disclosure.

Example 1: Example of Cosine and Sine Filters

The following study used inexpensive commercial plastic Cyan and Green filters that are sold in large sheets. The filters were cut to fit the filter holder of a DIVER microscope (Amazon, color filters, cat #B016Q0BA6A). These filters have a transmission response that is similar to a cos-sin response in the spectral region between 400-600 nm which is the active wavelength region for the DIVER microscope.

Figure 3:
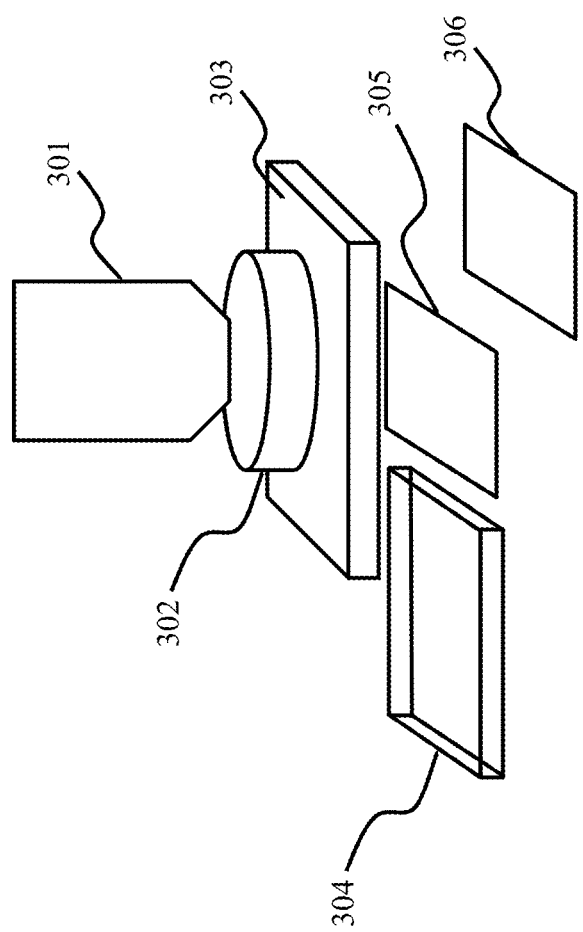
FIG. 3 is an image of an experimental setup of a prototype microscope system.

An diagram of the experimental setup is shown in FIG. 3. The setup includes a microscope objective 301, a container 302 with fluorescence solution, a scattering block 303, a transparent block 304, and two filters, a cyan filter (cosine) 305, and a green filter (sine) 306. Suitable fluorescence solutions include, but are not limited to, Rhodamine 6G (Em 552 nm), Coumarin 6 (Em 504 nm), and/or Coumarin 1 (Em 445 nm).

FIG. 4A shows the filter transmissions for the cos and sin filters as measured with the spectrophotometer. FIG. 4B shows the normalized spectrum in the region between 400 nm and 600 nm. Each filter spectrum is first normalized to be between 0 and 2 using the max-min of each spectra transmission and then the normalized spectrum is multiplied by 2 and shifted by −1 so that the value oscillates between +1 and −1 as it should be for a cosine and sine function. FIG. 4C shows the phasor polar plot representation according to Eq. (3). Note that the filters in FIG. 4A are not exactly representing the cosine and sine functions.

Figures 5A, 5B, 5C:
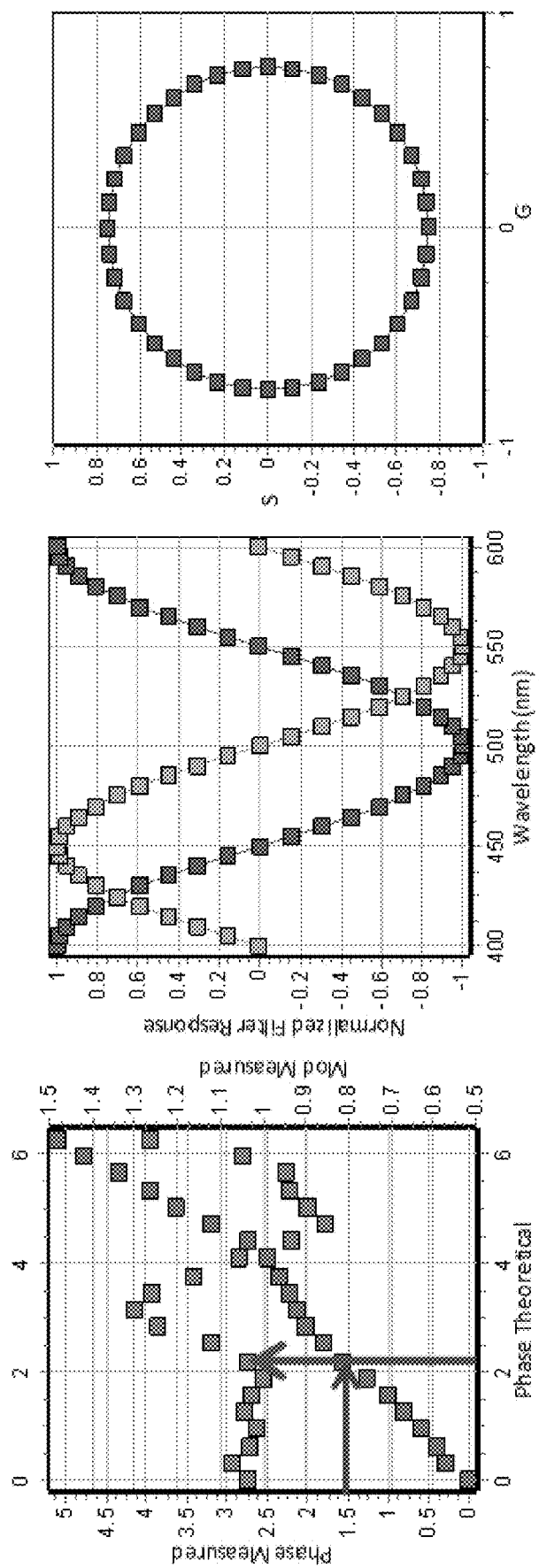
FIG. 5A through FIG. 5C depict the results of experiments demonstrating correction for the non-ideal response of the filters.

Next in FIG. 5A through FIG. 5C the ideal cosine and sine functions are calculated for the same spectral region and the deviation of the phase and modulation of the real filters are plotted with respect to the ideal filters as shown in FIG. 5A. The functions in FIG. 5A can be used to "correct" the real filters. Specifically, given a measured phase (horizontal arrow) and the measured modulation as obtained by the real filter, the values can be interpolated using the curves of FIG. 5A to obtain the phase and modulation of the ideal filter for each value of the phase. For any given value of the measured phase indicated by the horizontal arrow the theoretical value of the phase is obtained at that point. Then for the theoretical value of the phase, the correction is applied to the measured modulation value to obtain the theoretical modulation value at the measured phase. This correction can be done only if the plot of the measured phase with respect to the theoretical phase of FIG. 5A is monotonic. In few words, given a measured phase, the corrections can be calculated for the phase and the corresponding correction for the modulation.

These deviations can then be used to correct the filters to obtain the ideal cos-sin shape and then the correspondent phasor plot as shown in FIG. 5C. However, this correction, albeit small, compromises the law of linear combination because points at different phase are moved to fit the exact position corresponding to the mathematical form of the cos-sin functions. So if the law of linear combination is needed for analysis, this correction will not be used Example 2: Behavior of the Cos-Sin Filter in the Presence of Multiple Scattering Light of different wavelength using a tungsten lump and a monochromator were used to calibrate the cos-sin filter combination in the DIVER microscope. The output of the monochromator was coupled to the microscope using a mirror. In the DIVER collimated light was used to illuminate the filter with a direction perpendicular to the surface of the filter. This measurement provided the calibration for a transparent sample. For transparent samples, the spectral phasor can be obtained using only the cos-sin filters. A thick (5 mm) scattering slab was then added in front of the filters as shown in FIG. 1. In this case, the spectral phasor was also obtained with identical resolution as the transparent sample. The conclusion was that for strongly scattering samples, the same spectral phasor is obtained as for the transparent sample.

The monochromator was moved by increments of 10 nm starting at 400 nm and for each wavelength 3 measurements were acquired: with the cos filter, with the sin filter, and without the filters. Each measurement gave one intensity value. The value of $I_{cos}$ was obtained by the ratio of the total intensity through the cos filter to the total intensity without the filter. A similar procedure was used to obtain $I_{sin}$.

Figure 6:
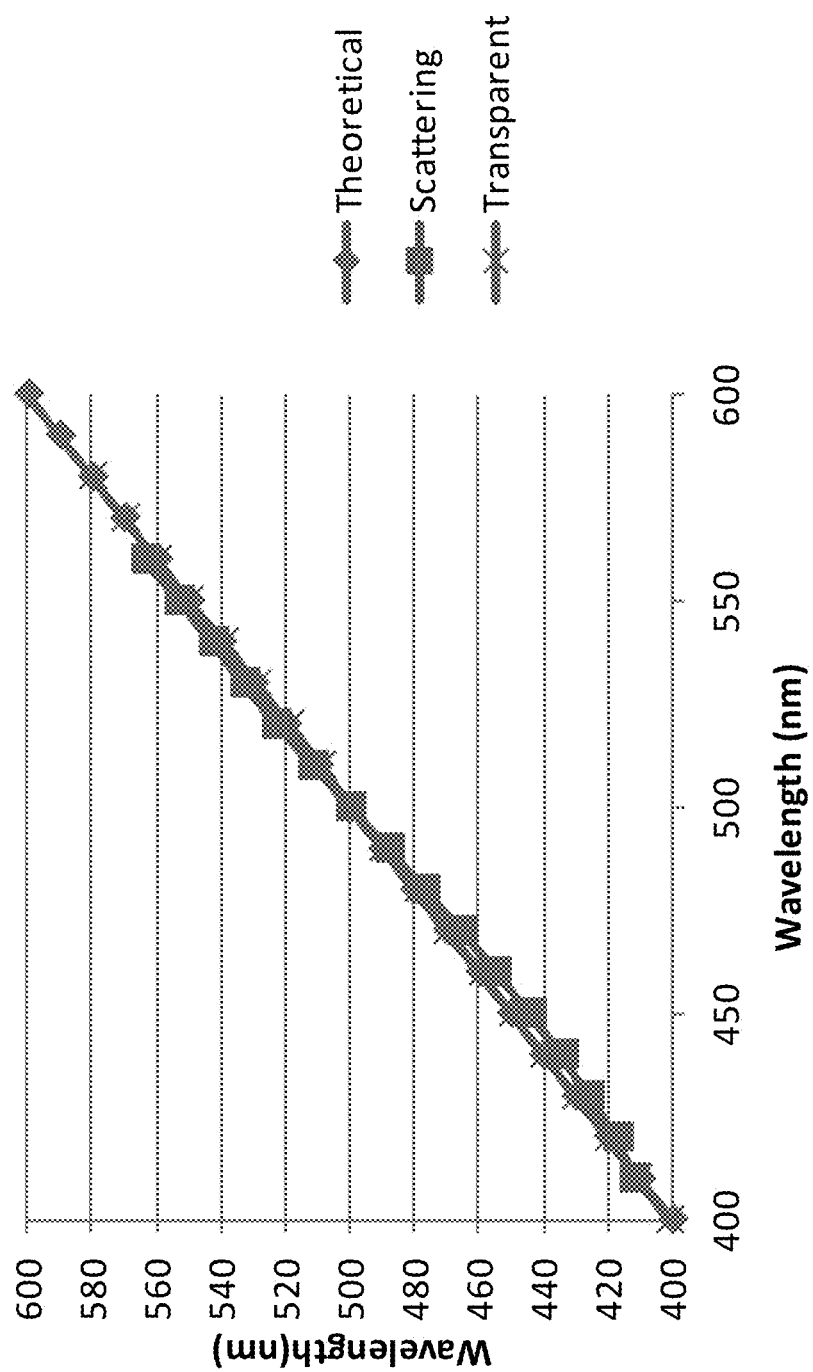
FIG. 6 depicts the calibration of the spectral phasor for a transparent and scattering sample. The expected correlation is perfect for the transparent media and has a very slight deviation due to scattering for the strongly scattering sample.

Eq. (5) was then used to obtain the G and S components of the spectral phasor. The phasor value at the wavelength selected by the monochromator was plotted in the phasor plot. The phase of the phasor spans between 0 to 360 degrees, with zero corresponding to 400 nm and 360 degrees corresponding to 600 nm. The wavelength corresponding to each angle is shown in FIG. 6. The data collection was repeated with the insertion of the scatter slab in front of the filter. FIG. 6 shows the values of the wavelength obtained by this procedure. The correlation between the measured values of the wavelength measured using the spectral phasor followed the expected value. For the collimated light, the correlation was perfect over the entire spectral bandwidth explored. When the scatter material is added in front of the filters, a deviation was observed in the low wavelength range and also a gradual deviation in the long wavelength range, presumably due to scattering. However, the deviation was surprisingly small. The spectral phasor response could be additionally corrected by this small deviation due to scattering. The DIVER response was very low above 600 nm due to additional bandpass filters present in the DIVER microscope.

The present study shows that a single channel detector and 3 measurements can be used to obtain the spectral phasor for any sample in a given spectral region. These three measurements can be obtained by rotating a wheel with the two filters and without a filter in rapid succession or projecting the image after passing through the filters in different regions of a camera. This implementation will provide hyperspectral imaging. The cos-sin filter combination is totally different from the RGB filters used in a color camera. The fundamental difference is that the RGB filters are intended to isolate the response in 3 wavelengths regions while the basic idea of the cos-sin filter is to use the filters to weight the spectral response in different parts of the spectrum and then obtain the spectral phasor using the total light transmitted through the filters.

Application to Solutions of Fluorophores

Figure 7:
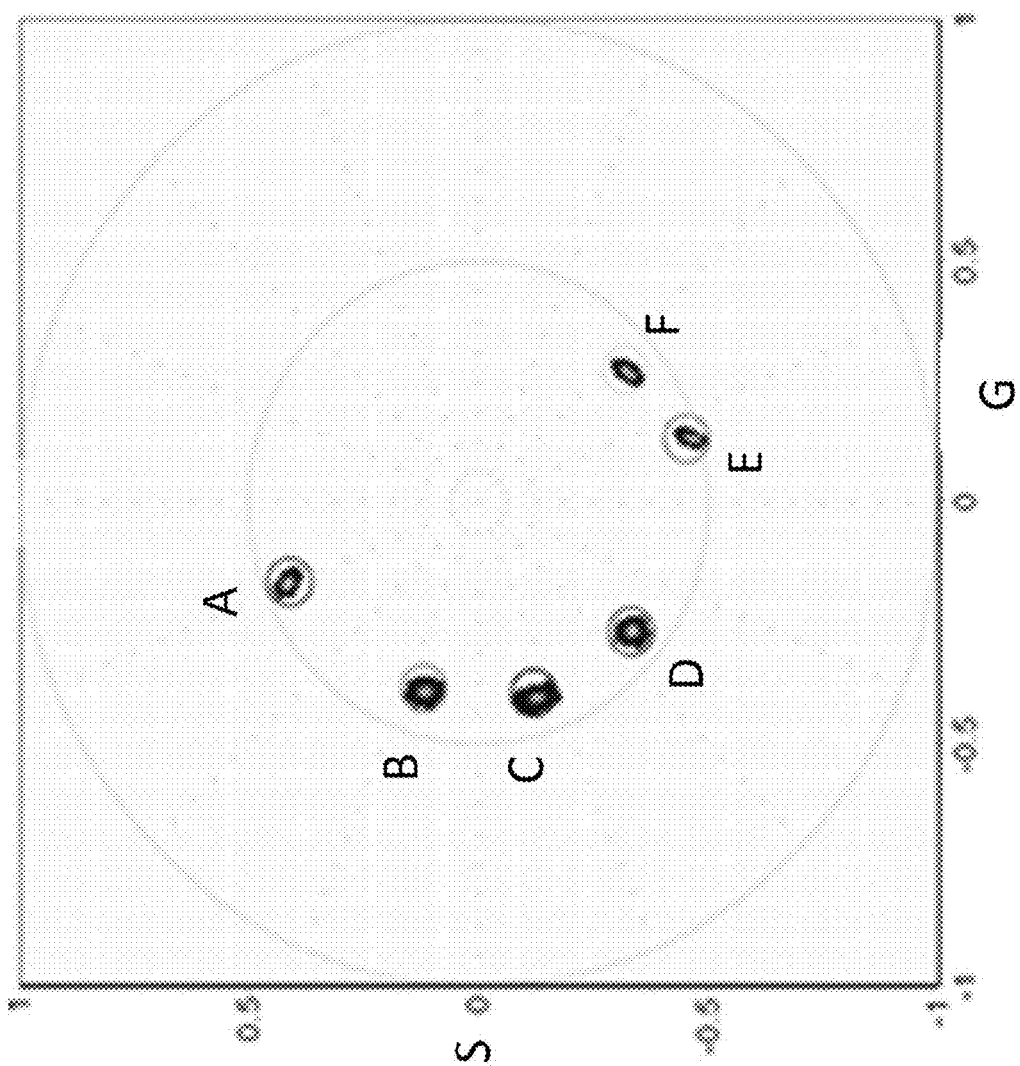
FIG. 7 depicts the measurement of the spectral phasor of 6 dye. The dye spectral phasor position recovered using a hyperspectral device and the spectral phasor position recovered by the cos-sin filter method: (a) Coumarin1/EtOH, 445 nm; (b) ECFP/buffer, 477 nm; (c) Coumarine6/MeOH, 504 nm; (d) Rhodamine 110/water, 520 nm; (e) Rhodamine 6G/EtOH, 552 nm; (f) Rhodamine B/water, 576 nm.

The spectral phasor was used with the DIVER microscope and the sin-cos filters discussed in the previous stud with calibration to determine the spectral phasor of 6 different solutions as shown in FIG. 7.

Figure 8:
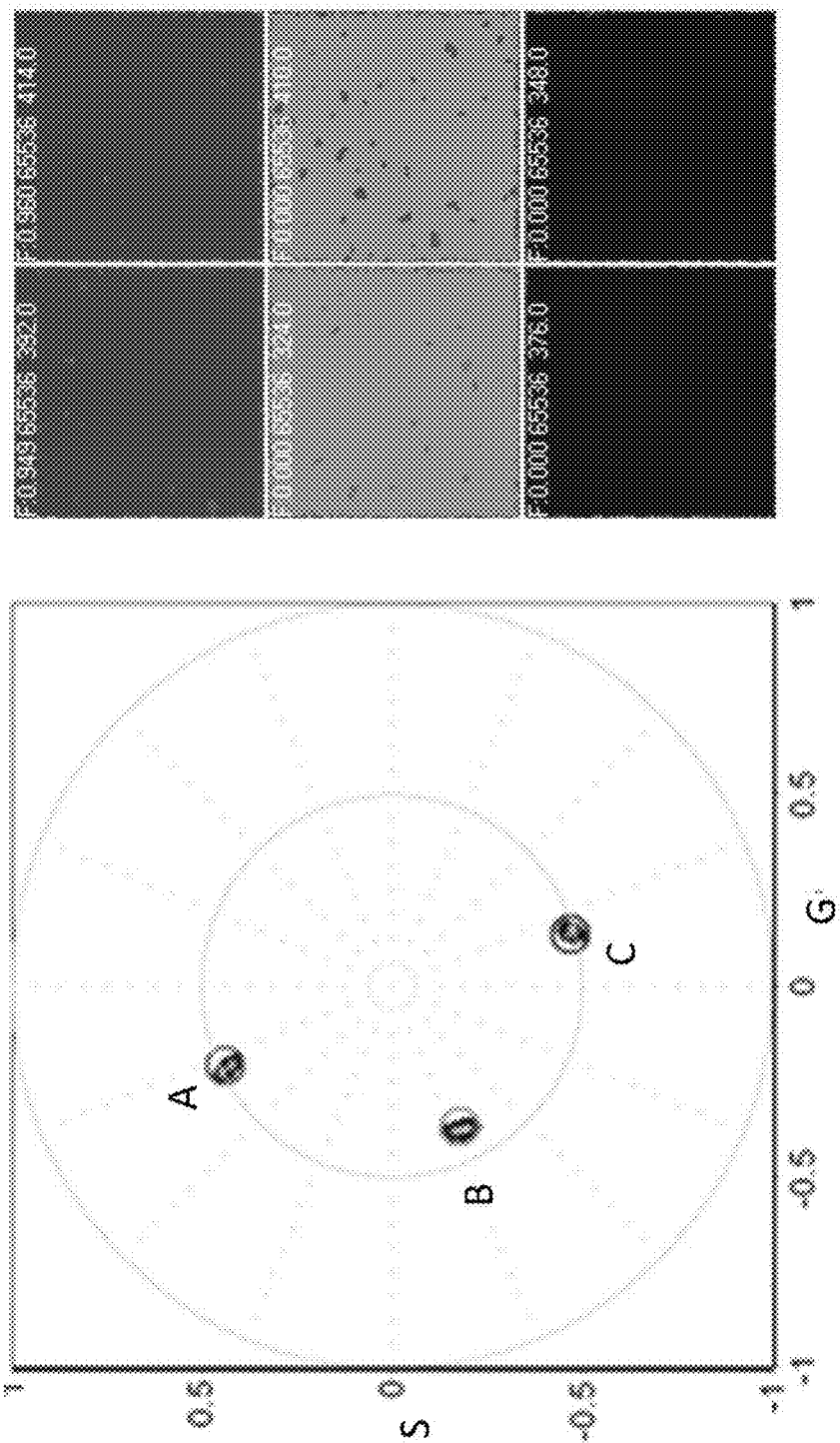
FIG. 8 depicts the spectral phasors of 3 dyes measured with and without the scattering slab: (a) Coumarin1/EtOH, 445 nm; (b) Coumarin6/MeOH, 504 nm; (c) Rhodamine 6G/EtOH, 552 nm. The presence of the scattering slab gives the same spectral phasor as with the transparent slab.

Application of the Spectral Phasors for Strongly Scattering Samples in Medical and Clinical Settings Each spot in FIG. 8 has the spectral phasor with and without passing the light through a clear media of 5 mm or a strongly scattering media slab also of 5 mm. The spectral phasor position is not dependent of scattering as shown by the coincidence of the spectral phasor with the clear slab or the scattering slab. In one example, the DIVER microscope due to the efficient light collection acts as an integrating sphere providing the true spectral phasor.

Application to Demonstrate the Law of Linear Combination of Spectral Phasors

Figure 9B:
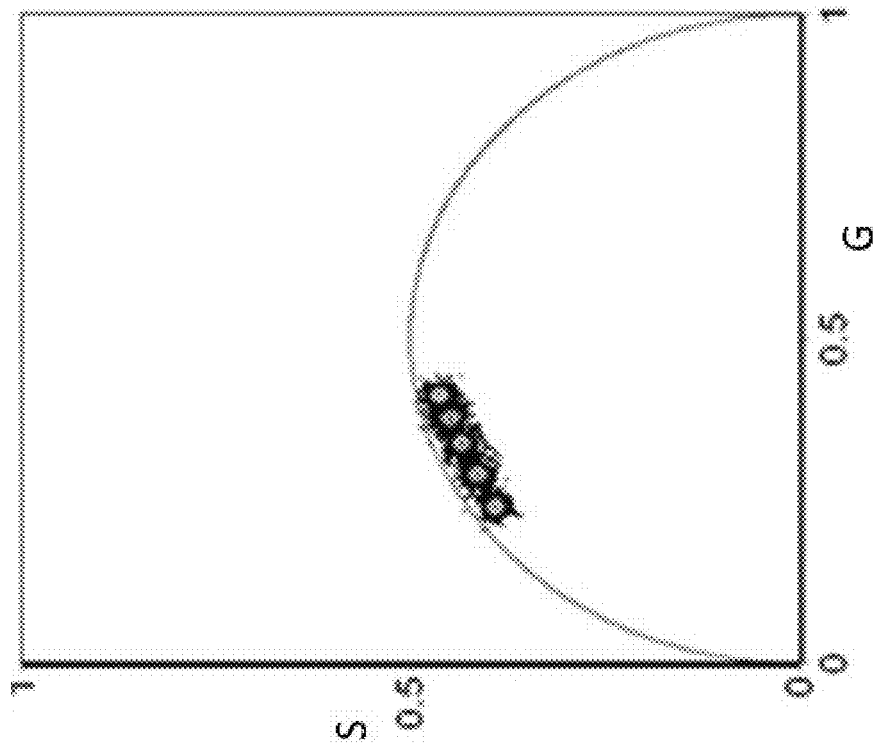
FIG. 9A and FIG. 9B depict the measurement of spectral phasor for a mixture of Coumarin6 and Rhodamine solutions.
Figure 9A:
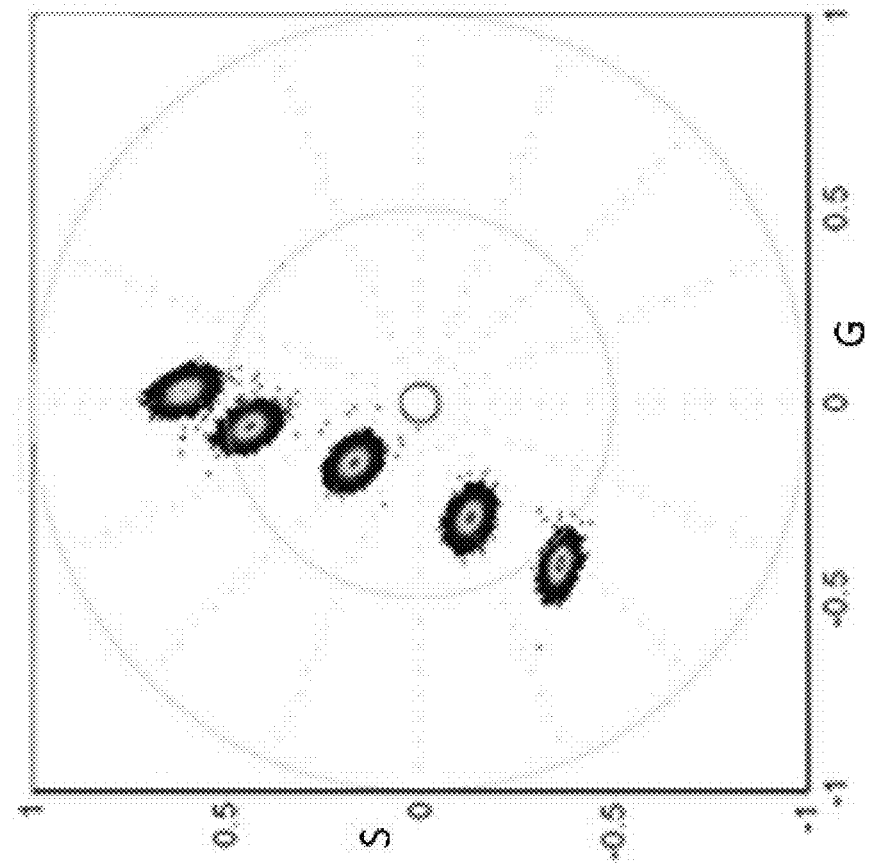

Although the span and the angular dependence are different for the ideal cos and sin filters and for the actual physical filters, the linear combination law is still valid as demonstrated in FIG. 9A. The results show that the law of linear combination is valid for the co-sin filters provided the filter corrections aren't applied. For comparison, FIG. 9B shows the linear combination law obtained using the lifetime phasor for the same solutions used for the spectral phasors.

Application to Show the Spectral Phasor of an Unknown Sample

Figures 10A, 10B:
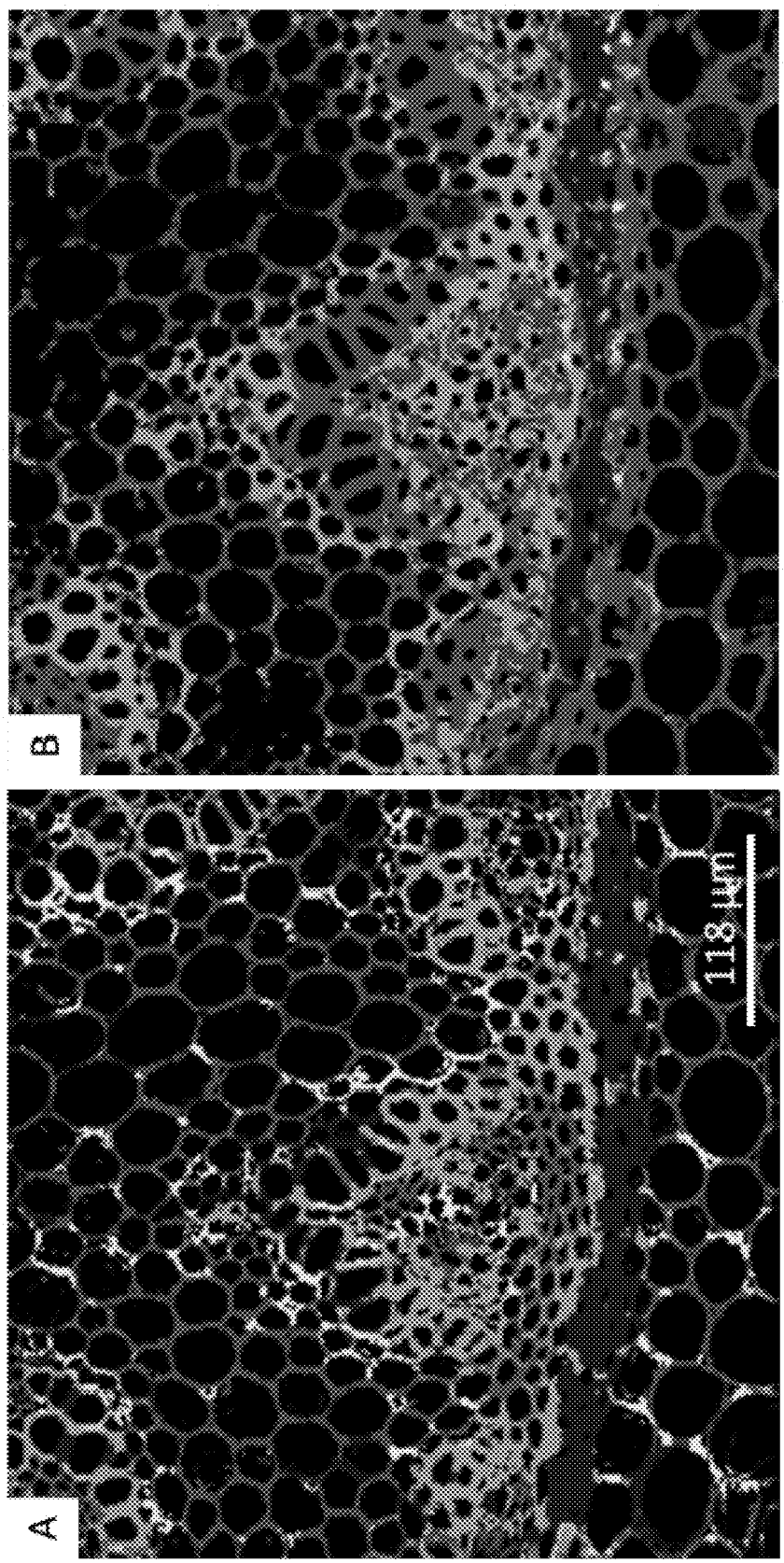
FIG. 10A and FIG. 10B depict hyperspectral images of a convallaria sample.

To demonstrate the performance of the cos-sin filter in hyperspectral images, a convallaria slide was used measured with a commercial hyperspectral method and using the cos-sin filter. The commercial hyperspectral device covers a wavelength region from 416 nm to 726 nm, while the cos-sin filter in the DIVER microscope works in the range 400 nm to 600 nm, therefore spectral difference are expected. However, the purpose of the hyperspectral images of FIG. 10A and FIG. 10B is to show the similarities between the two images and that the cos-sin filter is capable of distinguishing pixels with different emission in a slide containing different species emitting at different wavelengths.

Using inexpensive cyan-green filters, the spectral phasor of solutions and of unknown samples can be obtained by a simple calibration of the transmission of the filter to the theoretical cosine and sine functions used on the mathematical expressions of the spectral phasor's. There are no adjustable parameters involved in the calibration. The only information needed is the transmission of the filters in the region of sensitivity of the DIVER detector or any other microscope. If new filters are used or the region of sensitivity of the detector is different because the detector has been changed, new correction factors could easily be calculated using the procedures described herein.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An imaging system comprising:
   an excitation light source;
   a directing element positioned to direct light from the excitation light source toward a sample;
   a detector configured to measure incoming light from the sample;
   a filter cavity positioned between the sample and the detector;
   a first filter configured to be inserted into the filter cavity;
   a second filter configured to be inserted into the filter cavity; and
   a processing unit communicatively connected to the detector, configured to receive image data from the detector to form an image;
   wherein the first filter is a linearly increasing transmission filter and the second filter is a linearly decreasing transmission filter.

2. The system of claim 1, wherein the excitation light source is selected from the group consisting of: a Ti:Sa laser, a white laser, a widely tunable laser, a fiber laser, a tungsten lamp, and a white LED.

3. The system of claim 1, further comprising a light permeable media positioned between the sample and the filter cavity.

4. The system of claim 1, wherein the first filter is a plastic cyan transmission filter.

5. The system of claim 1, wherein the second filter is a plastic green transmission filter.

6. The system of claim 1, wherein the first filter and the second filter are provided on a rotating filter wheel having a filter space that is empty or has a transparent filter.

7. The system of claim 1, wherein the first filter and the second-filter are provided on a filter slide having a filter space that is empty or has a transparent filter.

8. The system of claim 1, comprising three detectors, wherein a first detector is coupled to the first filter, a second detector is coupled to the second filter, and a third detector is coupled to a transparent filter or to no filter.

9. The system of claim 1, wherein the detector has three detecting regions, a first region coupled to the first filter, a second region coupled to the second filter, and a third region coupled to a transparent filter or to no filter.

10. The system of claim 1, wherein the imaging system is incorporated into a camera having the first filter, the second filter, and a transparent filter applied to separate regions of the detector.

11. The system of claim 1, further comprising a group velocity dispersion (GVD) compensator.

12. The system of claim 1, further comprising an acoustic-optic modulator.

13. The system of claim 1, further comprising an x-y galvanometric scanner.

14. An imaging system comprising:
an excitation light source;
a directing element positioned to direct light from the excitation light source toward a sample;
a detector configured to measure incoming light from the sample;
a filter cavity positioned between the sample and the detector;
a first filter configured to be inserted into the filter cavity;
a second filter configured to be inserted into the filter cavity;
a processing unit communicatively connected to the detector, configured to receive image data from the detector to form an image; and
a non-transitory computer-readable memory with instructions stored thereon, which when executed by the processing unit, construct a hyperspectral image of a sample, the instructions comprising the steps of:
recording a light intensity as $F_1(\lambda)$ over a wavelength range while the first filter is positioned between the sample and the detector;
recording a light intensity as $F_2(\lambda)$ over the wavelength range while the second filter is positioned between the sample and the detector;
recording a total intensity as $I(\lambda)$ over the wavelength range with no filter or a transparent filter positioned between the sample and the detector;
calculating a normalized transmission of the first filter;
calculating a normalized total intensity of transmission through the first filter;
calculating a spectral phasor coordinate of the normalized total intensity through the first filter;
calculating the normalized transmission of the second filter;
calculating the normalized total intensity of transmission through the second filter;
calculating the spectral phasor coordinate of the normalized total intensity through the second filter; and
generating a hyperspectral image of the sample based on the calculated spectral phasor coordinates.

15. The system of claim 14, wherein the first filter is a cosine filter and the second filter is a sine filter.

16. A method of constructing a hyperspectral image of a sample, comprising the steps of:
passing an excitation light source through a sample and through a first filter and recording, with a detector, a light intensity as $F_1(\lambda)$ over a wavelength range;
passing the excitation light source through the sample and through a second filter and recording, with the detector, a light intensity as $F_2(\lambda)$ over the wavelength range;
passing the excitation light source through the sample unfiltered and recording, with the detector, a total intensity as $I(\lambda)$ over the wavelength range;
calculating a normalized transmission of the first filter;
calculating a normalized total intensity of transmission through the first filter;
calculating a spectral phasor coordinate of the normalized total intensity through the first filter;
calculating a normalized transmission of the second filter;
calculating a normalized total intensity of transmission through the second filter;
calculating a spectral phasor coordinate of the normalized total intensity through the second filter; and
generating a hyperspectral image of the sample based on the calculated spectral phasor coordinates.

17. The method of claim 16, wherein the wavelength range is between 400 nm and 1000 nm.

18. The method of claim 16, further comprising the steps of:
applying a first correction factor to the phase and amplitude of the normalized total intensity of transmission through the first filter; and
applying a second correction factor to the phase and amplitude of the normalized total intensity of transmission through the second filter.

19. A method of constructing a hyperspectral image of a sample, comprising the steps of:
passing an excitation light source through a sample and through a filter with linearly increasing transmission and recording, with a detector, a light intensity as $F_{increase}(\lambda)$ over a wavelength range;
passing the excitation light source through the sample and through a filter with linearly decreasing transmission and recording, with the detector, a light intensity as $F_{decrease}(\lambda)$ over the wavelength range;
calculating the channel ratio using a general polarization formula; and
generating a hyperspectral image of the sample based on the calculated channel ratio.

* * * * *